(12) United States Patent
Choi et al.

(10) Patent No.: US 9,054,878 B2
(45) Date of Patent: Jun. 9, 2015

(54) SYSTEM AND METHOD FOR SECURITY AUTHENTICATION OF POWER SYSTEM

(71) Applicant: LSIS CO., LTD., Anyang-si, Gyeonggi-do (KR)

(72) Inventors: Won Seok Choi, Anyang-si (KR); Jong Ho Park, Gwangmyeong-si (KR); Yong Hark Shin, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 14/039,593

(22) Filed: Sep. 27, 2013

(65) Prior Publication Data

US 2014/0149736 A1 May 29, 2014

(30) Foreign Application Priority Data

Nov. 28, 2012 (KR) .................. 10-2012-0136507

(51) Int. Cl.
*H04L 29/06* (2006.01)
*H04L 9/32* (2006.01)
*H04L 9/08* (2006.01)

(52) U.S. Cl.
CPC .......... *H04L 9/3263* (2013.01); *H04L 63/0823* (2013.01); *H04L 63/0428* (2013.01); *H04L 9/0825* (2013.01)

(58) Field of Classification Search
CPC ..... H04L 9/3263; H04L 9/3273; H04L 63/20; G06F 19/3412
USPC .................... 713/156, 158; 705/1.1
See application file for complete search history.

(56) References Cited

U.S. PATENT DOCUMENTS

| 7,996,238 | B2 * | 8/2011 | Ochi et al. ..................... 705/1.1 |
| 8,111,042 | B2 * | 2/2012 | Bennett ......................... 320/108 |
| 8,638,938 | B2 * | 1/2014 | Dare ............................. 380/277 |
| 2010/0077208 | A1 * | 3/2010 | Appiah et al. ................ 713/158 |

* cited by examiner

*Primary Examiner* — Thanhnga B Truong
(74) *Attorney, Agent, or Firm* — Lee, Hong, Degerman, Kang & Waimey

(57) ABSTRACT

A method for security authentication of a power system includes transmitting, by at least one power system, a signal for requesting performing authentication on at least one remote control server or an external terminal with which the power system is to perform communication, to an authentication server, receiving, by the power system, an authentication certificate generated by the authentication server, and perform authentication on the remote control server or the external terminal by using the authentication certificate, and when authentication is completed by the authentication server, performing communication, by the power system, with the authentication-completed remote control server or the external terminal through an open-type communication network.

2 Claims, 4 Drawing Sheets

SYSTEM AND METHOD FOR SECURITY AUTHENTICATION OF POWER SYSTEM

CROSS-REFERENCE TO RELATED APPLICATION

Pursuant to 35 U.S.C. §119(a), this application claims the benefit of earlier filing date and right of priority to Korean Application No. 10-2012-0136507, filed on Nov. 28, 2012, the contents of which is incorporated by reference herein in its entirety.

BACKGROUND OF THE INVENTION

1. Field of the Invention

The present disclosure relates to a system and method for security authentication of a power system.

2. Background of the Invention

Recently, as the Internet extends to cover a wide area, high quality video stream service and audio service can be used. A stream scheme includes a unicast scheme and a multicast scheme. A unicast scheme refers to communication between a single sender and a single receiver in the Internet, and a multicast scheme refers to communication between a single sender and multiple receivers.

Namely, a current power system communication network is a closed-type network using a dedicated communication network, like a unicast scheme, which has a high degree of security reliability with respect to data and authority to control, but its structures is not appropriate to employ an open-type communication network as a smart grid.

A smart grid, combining IT technologies to an existing power system, is a next-generation power network capable of maximizing energy efficiency. However, unlike an existing closed-type communication network, a smart grid uses an open-type communication network, and thus, data security and data reliability may be very low.

Thus, alteration of a communication network into an open-type communication network to implement a smart grid may weaken communication security between a power system and control devices.

SUMMARY OF THE INVENTION

Therefore, an aspect of the detailed description is to provide an apparatus and method for security authentication of a power system capable of configuring a power system such that it interworks with an open-type communication network (Internet), thus utilizing the system variously.

Another aspect of the detailed description is to provide an apparatus and method for security authentication of a power system capable of configuring a power system such that it interworks with an open-type communication network (Internet) and performing communication with high reliability in terms of security through mutual authentication between targets for performing communication.

To achieve these and other advantages and in accordance with the purpose of this specification, as embodied and broadly described herein, a method for security authentication of a power system, includes: transmitting, by at least one power system, a signal for requesting performing authentication on at least one remote control server or an external terminal with which the power system is to perform communication, to an authentication server; receiving, by the power system, an authentication certificate generated by the authentication server, and perform authentication on the remote control server or the external terminal by using the authentication certificate; and when authentication is completed by the authentication server, performing communication, by the power system, with the authentication-completed remote control server or the external terminal through an open-type communication network.

The performing of authentication by using the authentication certificate may include: receiving the authentication certificate generated by the authentication server; performing communication authentication with a server of a communication target by using the authentication certificate; sharing a symmetric key with the authentication-completed remote control server; encrypting data desired to be transmitted by using the symmetric key; transmitting the encrypted data; and decrypting, by the remote control server, the received encrypted data by using the shared symmetric key to obtain the data.

The receiving of the authentication certificate generated by the authentication server may include: transmitting a public key to the authentication server; and receiving, by the authentication server, the authentication certificate generated by using the public key.

The sharing of the symmetric key with the remote control server may include: receiving a public key from the remote control server; encrypting the symmetric key by using the received public key; and transmitting the encrypted symmetric key to the corresponding remote control server.

In the case of the system and method for security authentication of a power system according to an embodiment of the present invention, a power system can perform multi-communication by using an open-type communication network.

In the case of the system and method for security authentication of a power system according to an embodiment of the present invention, communication with high reliability can be performed through an open-type communication network.

In the case of the system and method for security authentication of a power system according to an embodiment of the present invention, an external system, a mobile device, and the like, are allowed to access in various manners, and thus, the system with high utilization can be implemented.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
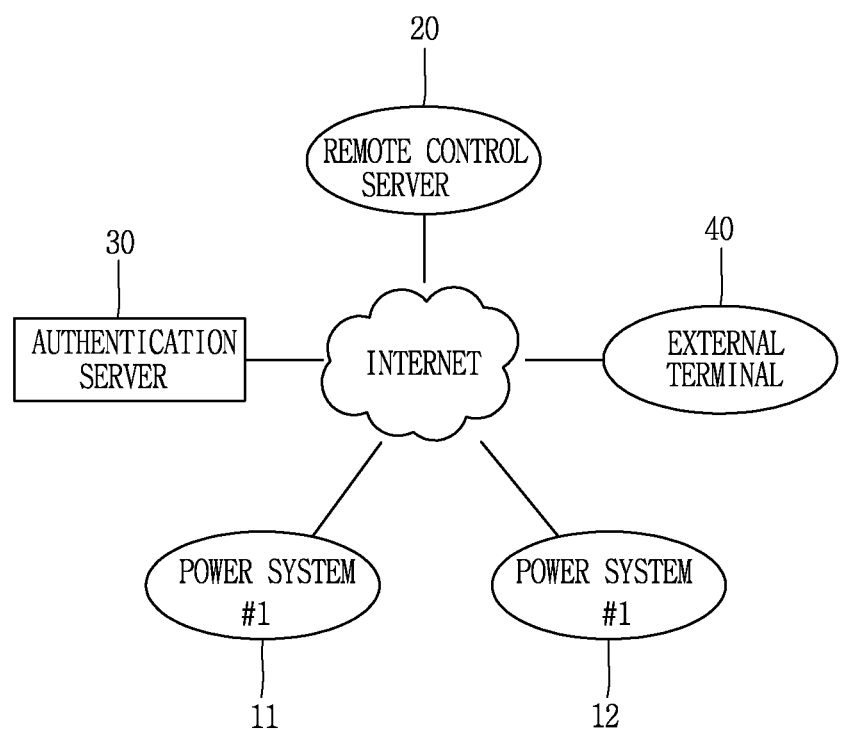
FIG. 1 is a block diagram of a system for security authentication of a power system to which an embodiment of the present invention is applied.

FIG. 1 is a block diagram of a system for security authentication of a power system to which an embodiment of the present invention is applied.

The system for security authentication of a power system to which an embodiment of the present invention is applied may include at least one power system 11 or 12, a remote control server 20, an authentication server 30, and at least one external terminal.

The power system 11 or 12 may produce power and distribute the produced power to a destination. Also, the power system 11 or 12 may make the produced power into data and transmit the data to the remote control server 20 and the designated external terminal 40. Also, the power system 11 or 12 may receive a control signal from the remote controller server 20 or the external terminal which has been mutually authenticated, and may be controlled by the corresponding signal.

The remote control server 20 may collect power data from at least one power system 11 and 12 and generate a control signal of the corresponding power system. The remote control server 20 according to an embodiment of the present invention may be authenticated through the authentication server 30 and perform authentication and data transmission and reception by using a public key and a symmetric key with the power systems. Also, the remote control server 20 may be connected to the external terminal 40 and transmit the data obtained from the power systems 11 and 12 to the external terminal 40.

The authentication serer 30 issues an authentication certificate to the power systems 11 and 12, the remote control server 20, and the external terminal 40. Since the authentication server 30 performs communication by using a public key algorithm according to an embodiment of the present invention, it may generate and distribute a public key authentication certificate.

The external terminal 40 may include various types of mobile terminals, and the like. The external terminal 40 according to an embodiment of the present invention may be authenticated through the authentication server 30, performs mutual authentication with at least one power system 11 or 12 or the remote control server 20 to obtain data from the power system 11 or 12 or the remote control server.

Figure 2:
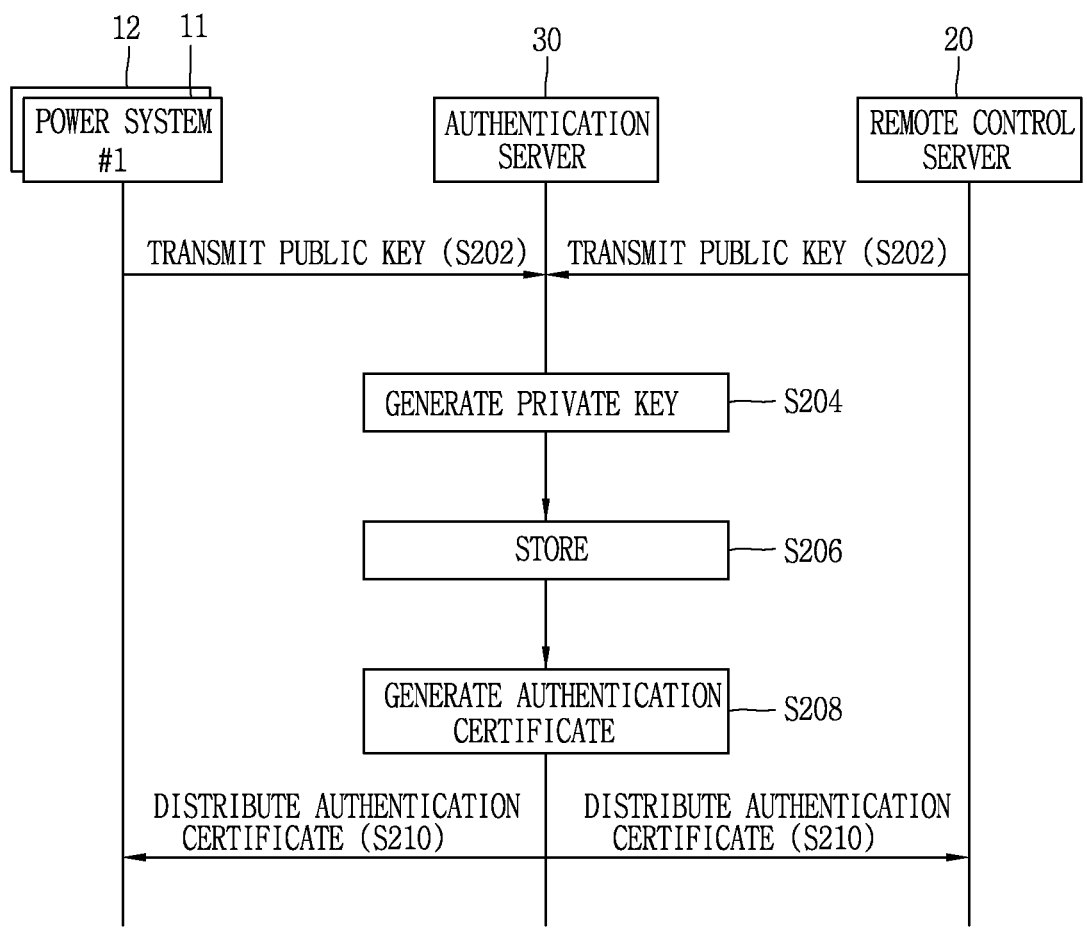
FIG. 2 is a flow chart illustrating a communication authentication operation according to an embodiment of the present invention.

FIG. 2 is a flow chart illustrating a communication authentication operation according to an embodiment of the present invention.

Referring to FIG. 2, the power system 11 or 12 and the remote control server 20 according to an embodiment of the present invention perform authentication by using the authentication server 30.

The authentication server 30 may receive a public key from the at least one power system 11 or 12, the remote control server 20, or the external terminal 40 (S202).

The authentication server 30 may generate a private key of the power system 11 or 12 and the remote control server 20 with reference to the received public key (S204) and store the generated private key (S206). The authentication server 30 generates an authentication certificate by using the generated and stored private key and public key (S208) and distribute the generated authentication certificate to the corresponding power system 11 or 12 and the remote control server 20 (S210).

Upon receiving the distributed authentication certificate from the authentication server 30, the corresponding power system 11 or 12 and the remote control server 20 may perform authentication for communication by using the authentication certificate.

Figure 3:
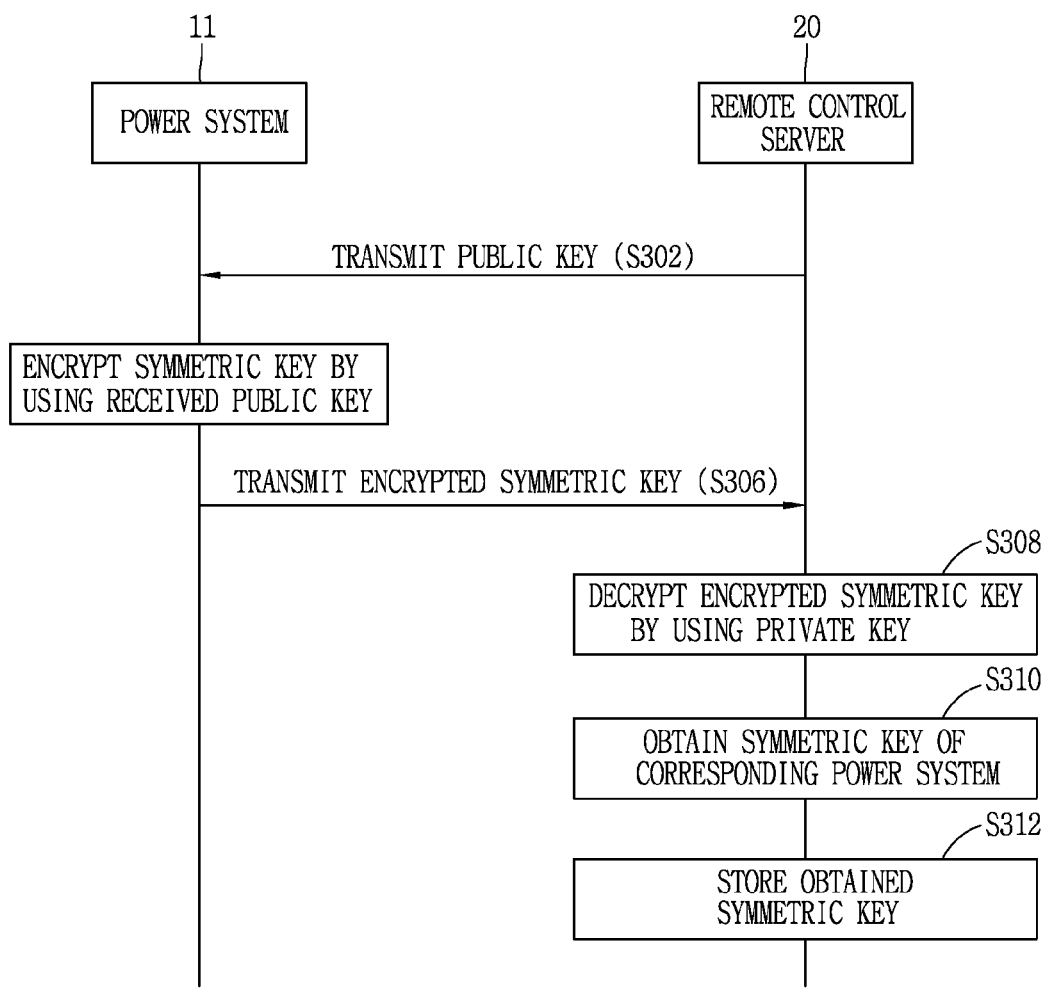
FIG. 3 is a flow chart illustrating an operation of performing mutual authentication between communication target devices according to an embodiment of the present invention.

FIG. 3 is a flow chart illustrating an operation of performing mutual authentication between communication target devices according to an embodiment of the present invention.

Referring to FIG. 3, the corresponding power system 11 and the remote control server 20 which have received the authentication certificate distributed by the authentication server 30 perform mutual authentication for performing data communication.

The power system 11 receives a public key from the remote control server 20 (S302). The power system 11, which has received the public key from the remote control server 20, encrypts a symmetric key by using the received public key (S304).

The power system 11 may transmit the encrypted symmetric key to the corresponding remote control server 30 (S306).

The remote control server 20 may decrypt the encrypted symmetric key received from the power system 11 by using a private key (S308).

The remote control server 20 may obtain the decrypted symmetric key by using the private key (S310) and store the symmetric key of the power system 11 which desires to perform communication (S312).

Also, the power system 11 may transmit the public key to the remote control server 20 and decrypt the encrypted symmetrical key received from the remote control server 20 to obtain and store the symmetric key of the remote control server 20 with which the power system 11 desires to perform communication.

Thus, by sharing the symmetric key with respect to the targets with which communication is desired to be performed mutually, mutual authentication for communication can be completed.

Hereinafter, a data transmission and reception between the mutually authenticated power system 11 and the remote control server 20 will be described.

Figure 4:
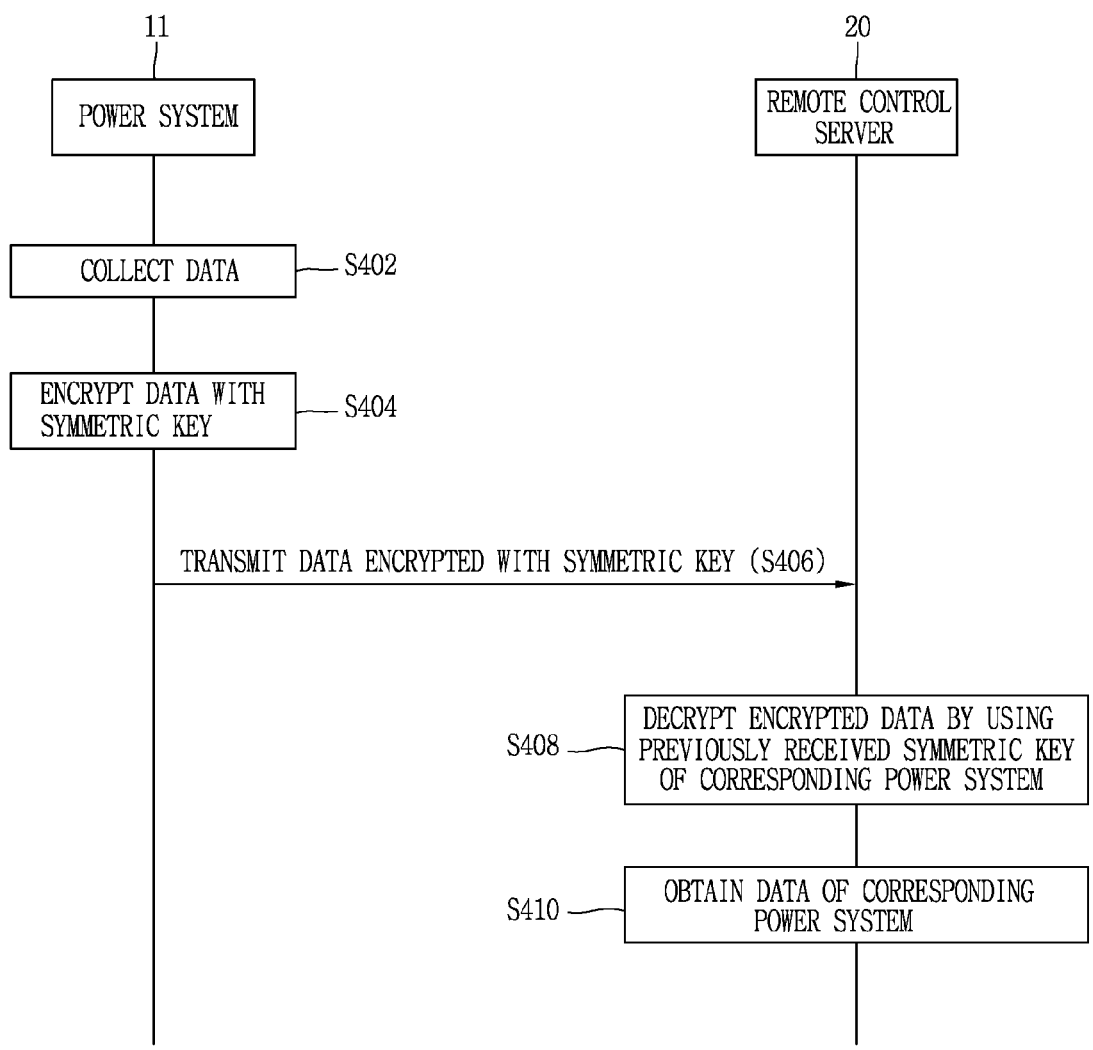
FIG. 4 is a flow chart illustrating an operation of transmitting and receiving data according to an embodiment of the present invention.

FIG. 4 is a flow chart illustrating an operation of transmitting and receiving data according to an embodiment of the present invention.

Referring to FIG. 4, the mutually authenticated power system 11 and the remote control server 20 are in a standby mode for transmitting and receiving data and control signals. In the standby mode, the power system 11 may collect power data during a predetermined period of time or in real time (S402), and encrypt the collected data with a symmetric key (S404).

The power data of the power system 11, which has been encrypted with the symmetric key, may be transmitted to the mutually authenticated corresponding remote control server 20 (S406).

The remote control server 20 may decrypt the encrypted data by using the symmetric key of the power system 11 which has been received previously during mutual authentication (S408).

The remote control server 20 may obtain the decrypted data by using the symmetric key of the power system 11, store the same, and output the same to the outside.

Also, the remote control server 20 may transmit a control signal to the corresponding power system 11 on the basis of the obtained data. In this case, like the power data received from the power system 11, the control signal may be encrypted by using the symmetric key of the remote control server 20 and the encrypted control signal may be transmitted to the corresponding power system 11.

The control signal encrypted with the symmetric key transmitted to the power system may be decrypted by using the symmetric key of the remote control server 20 obtained during the mutual authentication and obtained.

Thus, the power system and the remote control server or the external terminal which have been mutually authenticated by using the public key may transmit and receive data by using the symmetric key shared during the mutual authentication, whereby security and reliability of data can be increased.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method for security authentication by a power system, the method comprising:
    transmitting a signal to an authentication server to request authentication on at least one remote control server or an external terminal with which the power system is to perform communication;
    transmitting a public key to the authentication server;
    receiving an authentication certificate transmitted by the authentication server, the authentication certificate generated by the authentication server using the transmitted public key;
    performing authentication on the at least one remote control server or the external terminal using the received authentication certificate; and
    performing communication with the authenticated at least one remote control server or the external terminal through an open-type communication network when authentication is completed by the authentication server;
    wherein performing authentication comprises:
        receiving a remote control server public key from the at least one remote control server;
        encrypting a symmetric key using the received remote control server public key; and
        transmitting the encrypted symmetric key to the at least one remote control server.

2. The method of claim 1, further comprising:
    encrypting data desired to be transmitted using the symmetric key; and
    transmitting the encrypted data to the at least one remote control server for decryption by the at least one remote control server using the symmetric key, wherein the symmetric key is decrypted from the transmitted encrypted symmetric key by the at least one remote control server.

* * * * *